United States Patent
Zhang

(10) Patent No.: US 10,020,675 B1
(45) Date of Patent: Jul. 10, 2018

(54) EMERGENCY LAMP TUBE AND BULB

(71) Applicant: Kanghong Zhang, Santa Fe Springs, CA (US)

(72) Inventor: Kanghong Zhang, Santa Fe Springs, CA (US)

( * ) Notice: Subject to any disclaimer, the term of this patent is extended or adjusted under 35 U.S.C. 154(b) by 0 days.

(21) Appl. No.: 15/631,400

(22) Filed: Jun. 23, 2017

Related U.S. Application Data

(60) Provisional application No. 62/468,135, filed on Mar. 7, 2017.

(51) Int. Cl.
*H05B 37/04* (2006.01)
*H02J 9/02* (2006.01)
*H05B 33/08* (2006.01)

(52) U.S. Cl.
CPC ............ *H02J 9/02* (2013.01); *H05B 33/0803* (2013.01); *H05B 37/04* (2013.01)

(58) Field of Classification Search
CPC ............... H05B 37/04; H05B 37/0272; H05B 33/0803; H05B 33/0824; H05B 33/0815; H05B 33/0809; H05B 33/0842; H05B 41/2853; H02J 7/02; H02J 7/007; H02J 7/0029; H02J 9/061; H02J 9/062; Y10T 307/625; H01J 9/02; F21S 9/022
See application file for complete search history.

(56) References Cited

U.S. PATENT DOCUMENTS

| | | | | |
|---|---|---|---|---|
| 5,365,145 A * | 11/1994 | Fields | ........................ | H02J 9/02 307/66 |
| 6,028,510 A * | 2/2000 | Tamam | .................... | G07B 13/02 307/10.8 |
| 6,710,546 B2 * | 3/2004 | Crenshaw | .................. | H02J 9/02 315/150 |
| 7,391,159 B2 * | 6/2008 | Harwood | ................ | G08B 7/066 307/66 |
| 9,137,866 B2 * | 9/2015 | McBryde | ............ | H05B 33/0815 |
| 9,270,143 B1 * | 2/2016 | Mangiaracina | ......... | H02J 9/062 |
| 9,335,008 B2 * | 5/2016 | Fujita | ....................... | F21S 9/022 |
| 2015/0048685 A1 * | 2/2015 | Wilson | ..................... | H02J 9/062 307/66 |
| 2016/0328928 A1 * | 11/2016 | Lutz | ......................... | G08B 5/36 |
| 2016/0356469 A1 * | 12/2016 | Garcia | ................... | H02J 7/0086 |
| 2017/0310157 A1 * | 10/2017 | Cannon | ................... | H02J 9/061 |

* cited by examiner

*Primary Examiner* — Haissa Philogene
(74) *Attorney, Agent, or Firm* — Clement Cheng

(57) ABSTRACT

An emergency lamp has a first line contact configured for connection to a first line. A second line contact is configured for connection to a second line. The second line is not switched. A neutral line contact is configured for connection to a neutral line. The voltage checker changes a mode of a main driver enablement signal and an emergency driver enablement signal when the voltage checker does not sense voltage. The voltage checker is electrically connected to the second line. A main driver is powered by the first line and the neutral line. The main driver is controlled by the main driver enablement signal. An emergency driver is powered by a battery. The battery is maintained by a charge controller. The charge controller is powered by the second line and the neutral line. The emergency driver is controlled by an emergency driver enablement signal.

6 Claims, 4 Drawing Sheets

EMERGENCY LAMP TUBE AND BULB

The present invention is a non-provisional of U.S. provisional application 62/468,135 filed Mar. 7, 2017, entitled Emergency Lamp Tube And Bulb by same inventor Kanghong Zhang, the disclosure of which is incorporated herein by reference.

FIELD OF THE INVENTION

The present invention is in the field of emergency lighting for LED lamps.

DISCUSSION OF RELATED ART

Traditionally, fluorescent bulbs have been made in tubes. More recently, LED fixtures are also made as tubes. A variety of LED fixtures have emergency features. Also emergency features have been incorporated into lighting. For example, inventor Gregory Fields describes an emergency lighting system in U.S. Pat. No. 5,365,145 issued Nov. 15, 1994 entitled Emergency Lighting System, the disclosure of which is incorporated herein by reference. Fields describes an AC regular operating mode and then a DC battery backup system.

Inventor Ronald Harwood in U.S. Pat. No. 7,391,159 issued Jun. 24, 2008, the disclosure of which is incorporated herein by reference, describes a lighting device with a secondary power source, including a battery backup. The battery backup 30 is controlled by the controller 28 and can be located within the light bulb.

SUMMARY OF THE INVENTION

An emergency lamp has a first line contact configured for connection to a first line. A second line contact is configured for connection to a second line. The second line is not switched. A neutral line contact is configured for connection to a neutral line. The voltage checker changes a mode of a main driver enablement signal and an emergency driver enablement signal when the voltage checker does not sense voltage. The voltage checker is electrically connected to the second line. A main driver is powered by the first line and the neutral line. The main driver is controlled by the main driver enablement signal.

An emergency driver is powered by a battery. The battery is maintained by a charge controller. The charge controller is powered by the second line and the neutral line. The emergency driver is controlled by an emergency driver enablement signal.

The lamp is powered by the main driver during a state of normal operation, and the lamp is powered by the emergency driver during a state of emergency operation. The lamp further includes a lamp housing retaining a circuit board. The circuit board retains LED chips mounted to the circuit board. A primary driver rectifier powers the main driver, and further includes a secondary driver rectifier powering the charge controller.

The voltage checker can be an OR circuit or can be a single input. The lamp housing can be bulb shaped or tubular. If the lamp housing is tubular, it can have a first housing connector and a second housing connector. The first housing connector is connected to the first line and the second line. The second housing connector is connected to the neutral line. The lamp housing is tubular and has a first housing connector and a second housing connector. The first housing connector is connected to the first line and the neutral line, and the second housing connector is connected to the second line.

Figure 1:
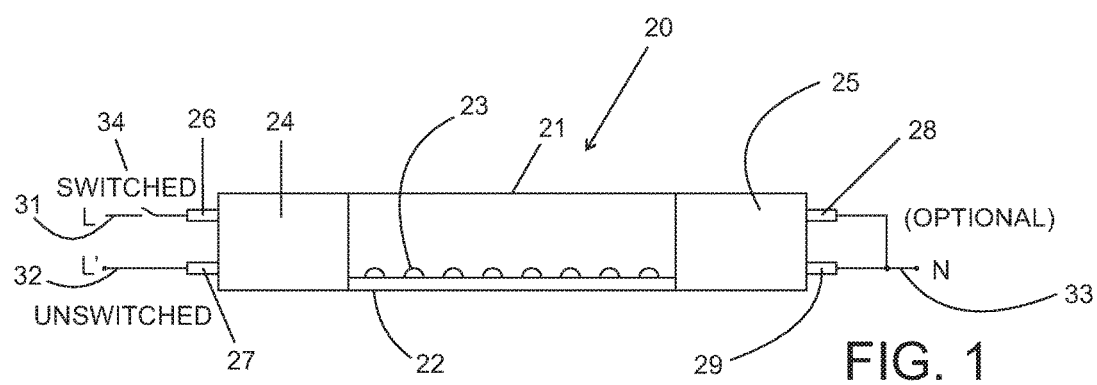
FIG. 1 is a side view of the present invention.

The following call out list of elements can be a useful guide in referencing the elements of the drawings.

20. Lamp
21. Lamp Housing
22. Circuit Board
23. LED Chip
24. First Housing Connector
25. Second Housing Connector
26. First Line Terminal
27. Second Line Terminal
28. Second Neutral Terminal
29. First Neutral Terminal
31. First Line In
32. Second Line In
33. Neutral Line In
34. Line Switch
41. First Line Primary Diode
42. Second Line Primary Diode
43. Neutral Line Primary Diode
44. First Line Secondary Diode
45. Second Line Secondary Diode
46. Neutral Line Secondary Diode
51. OR Circuit
52. OR Circuit Second Line Input
53. OR Circuit First Line Input
54. OR Circuit Output
55. Enable Line
56. Main Driver Enablement Signal
57. Emergency Driver Enablement Signal
60. Main Driver
61. Driver Line In
62. Driver Neutral In
63. Driver Line Out
64. Driver Neutral Out
70. Switched Controller
71. Switched Controller Line In
72. Switched Controller Neutral In
73. Switched Controller Line Out
74. Switched Controller Neutral Out
80. Emergency Driver
81. Emergency Driver Battery Line Input
82. Emergency Driver Neutral Input
83. Emergency Driver Line Output
84. Emergency Driver Neutral Output
85. Emergency Driver Neutral Input
90. Battery
91. Battery Positive Terminal
92. Battery Negative Terminal
93. Primary Rectifier
94. Secondary Rectifier
95. Voltage Checker

DETAILED DESCRIPTION OF THE PREFERRED EMBODIMENT

The following glossary is a description of abbreviations used in the specification.

L stands for line voltage which is switched.

L' stands for line voltage which is constant and not switched.

N stands for neutral, a common household electrical standard.

LED stands for light-emitting diode, a popular lighting technology.

The present invention as a backup emergency ballast. The lamp 20 generally has a lamp housing 21. The lamp housing 21 holds a circuit board 22. The circuit board has a plurality of LED chips 23 which are mounted on the circuit board 22. The LED chips are mounted in an array such as a linear array. The lamp housing 21 can be tubular with a circular cross-section. The tubular lab housing 20 can have a first housing connector 24 and a second housing connector 25 formed as end caps.

As seen in FIG. 1, the LED tube accepts a line voltage input on one side and neutral on the other side. Here, L is a switched line for normal light purposes. The switch could be a wall switch, relay, sensors or other switches to turn on and off the light. Then, L' is an un-switched line for emergency purposes. It connects to power panel direct and won't be affected by switches. As seen in FIG. 1, the end caps can have a standard configuration such as the type commonly found on florescent lighting tubes. Then caps can have protruding terminals that engage to standard florescent lighting tubes. The first housing connector 24 has a first line terminal 26 and a second line terminal 27. The second housing connector 25; has a first neutral terminal 29 and a second neutral terminal 28. The first line terminal 26 is connected to a line switch 34. The first line in 31 is connected to the line switch 34 such that the line switch 34 connects the first line in 31 to the first line terminal 26. The first line in is a line voltage, which can be alternating current for example. The second line in 32 is always on and is not a switched line. The second line in 32 is also a line voltage which can be alternating current. The second line in 32 is connected to the second line terminal 27. The second housing connector 25 has a second neutral terminal 28 and the first neutral terminal 29 that receives a neutral line in 33. The neutral line in 33 can be an alternating current such as household electric current. The second neutral terminal 28 can be electrically connected to the first neutral terminal 29.

Figure 2:
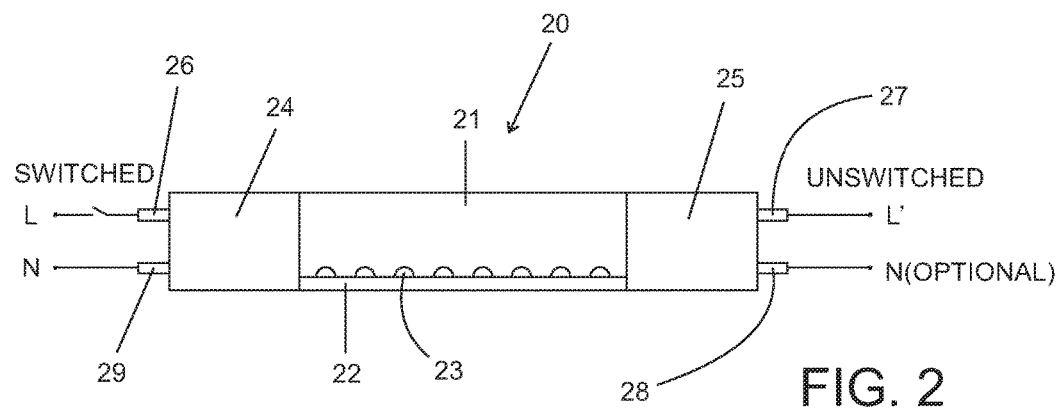
FIG. 2 is another side view of the present invention in an alternate embodiment.

As seen in FIG. 2, the neutral terminals can be on opposite ends and the line in terminals can also be on opposite ends. For example, the first housing connector 24 can have a first line terminal 26 and a first neutral terminal 29. Similarly, the second housing connector 25 can have a second line terminal 27 and a second neutral terminal 28. Again, the first line terminal 26 is switched and the second line terminal 27 is constantly on. As seen in FIG. 2, the LED tube accepts switched L and N on one side, and un-switched L' and N on the other side. Only one N must be connected, the other N could be optional.

Figure 3:
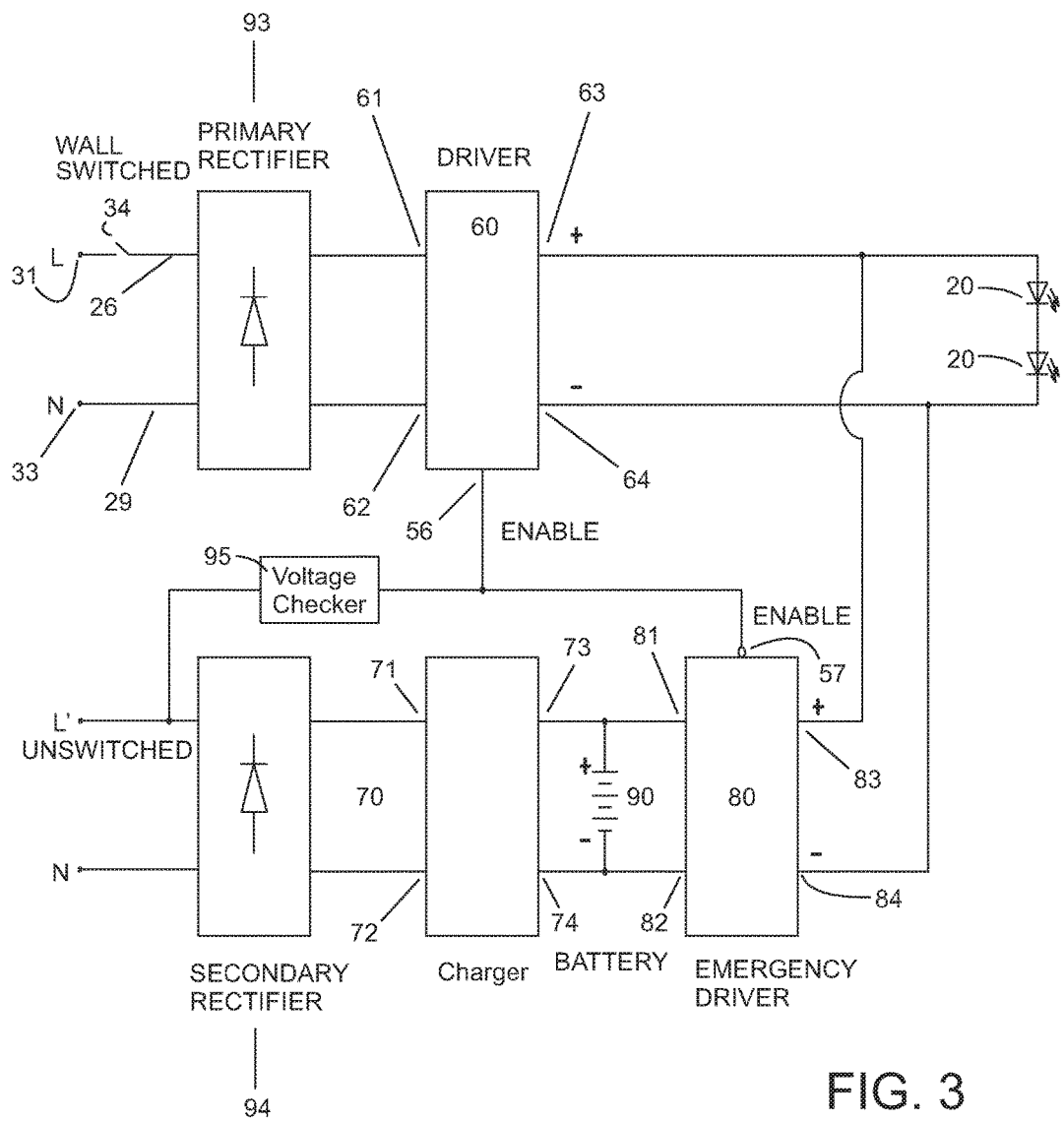
FIG. 3 is a circuit diagram of the invention.

As seen in FIG. 3, the rectifier can provide a direct current to a driver. A second rectifier can provide a direct current to a battery charger such as a battery charge controller 70. The battery charge controller 70 can provide a charge for a battery 90. The battery charge controller 70 can also be called a switched controller. The switched controller has a switched controller line in 71 and a switched controller neutral in 72 to power the switched controller. The switched controller also has a switched controller line out 73 and a switched controller neutral out 74. The voltage checker 95 checks for voltage on the unswitched line which then changes the mode of the main driver enablement signal 56 and the emergency driver enablement signal 57 when the unswitched line lacks voltage. Changing the mode of the signals activates the emergency driver 80 and shuts off the main driver 60.

The battery 90 can activate the emergency driver 80 when the primary driver 60 is out of operation. The first rectifier is a primary rectifier 91. The primary rectifier 91 is connected to the line in at a first line in 31 and a neutral line in 33. The rectifier may have terminals such as the first line terminal 26 and the first neutral terminal 29. The rectifier is connected to the primary driver 60. The 60 has a driver line in 61 and a driver neutral in 62. The driver produces a driver line out 63 and a driver neutral out 64 to power lamps 20. The lamps 20 can be in a series.

The driver 60 also has a main driver enablement signal 56 that is connected to an emergency driver enablement signal 57 on the emergency driver 80. When the driver 60 ceases to function, the signal state of the main driver enablement signal 56 changes which triggers the activation of the emergency driver 80. The emergency driver has an emergency driver positive input and an emergency driver negative input. The emergency driver positive input can correspond to the emergency driver battery line input 81 and the emergency driver battery neutral input 82 can correspond to the emergency driver negative input. In any case, the emergency driver is powered by the battery through a pair of terminals on the battery 90 including the battery positive terminal 91 and the battery negative terminal 92. The battery positive terminal 91 is connected to the emergency driver battery line input 81 and the battery negative terminal 92 is electrically connected to the emergency driver battery neutral input 82. The emergency driver 80 produces a voltage output for powering the lamps 20 at the emergency driver line output 83 and at the emergency driver neutral output 84.

In the first figure, the installation defines L and L' on two connections on the lamp socket and the lamp can only be installed one way in one orientation. Due to the fact that L and L' are different and must be distinguished, the normal operation circuit and emergency circuit could not be made separate to provide compatibility in both orientations. Now as seen in FIG. 3, the configuration can be configured to distinguish L and L' on a socket. At the top of the figure, L and N go through the primary rectifier 93, then to a main driver 60 to drive the LED load. On the bottom of the figure, L' and N go through the secondary rectifier 94, then to the charger 70 to charge the battery 90. The battery will power the emergency driver to drive LED load.

Since driver and emergency should not work at the same time, L' will go through a voltage comparator. If there is voltage on L', then the system is operating in a normal condition, so the signal will enable the driver for normal operation and at the same time disable the emergency driver. The change of state of the main driver enablement signal 56 and the emergency driver enablement signal 57 activates the emergency driver. The main driver enablement signal 56 and the emergency driver enablement signal 57 could be a high or low voltage such as 5V or 0V for example.

When there is no voltage on L', this is the emergency condition, so the main driver enablement signal 56 will disable the driver for normal operation and the emergency driver enablement signal 57 will enable the emergency driver for emergency operation. The main driver enablement signal 56 can be the same as the emergency driver enablement signal 57, or can be independent signals.

Figure 4:
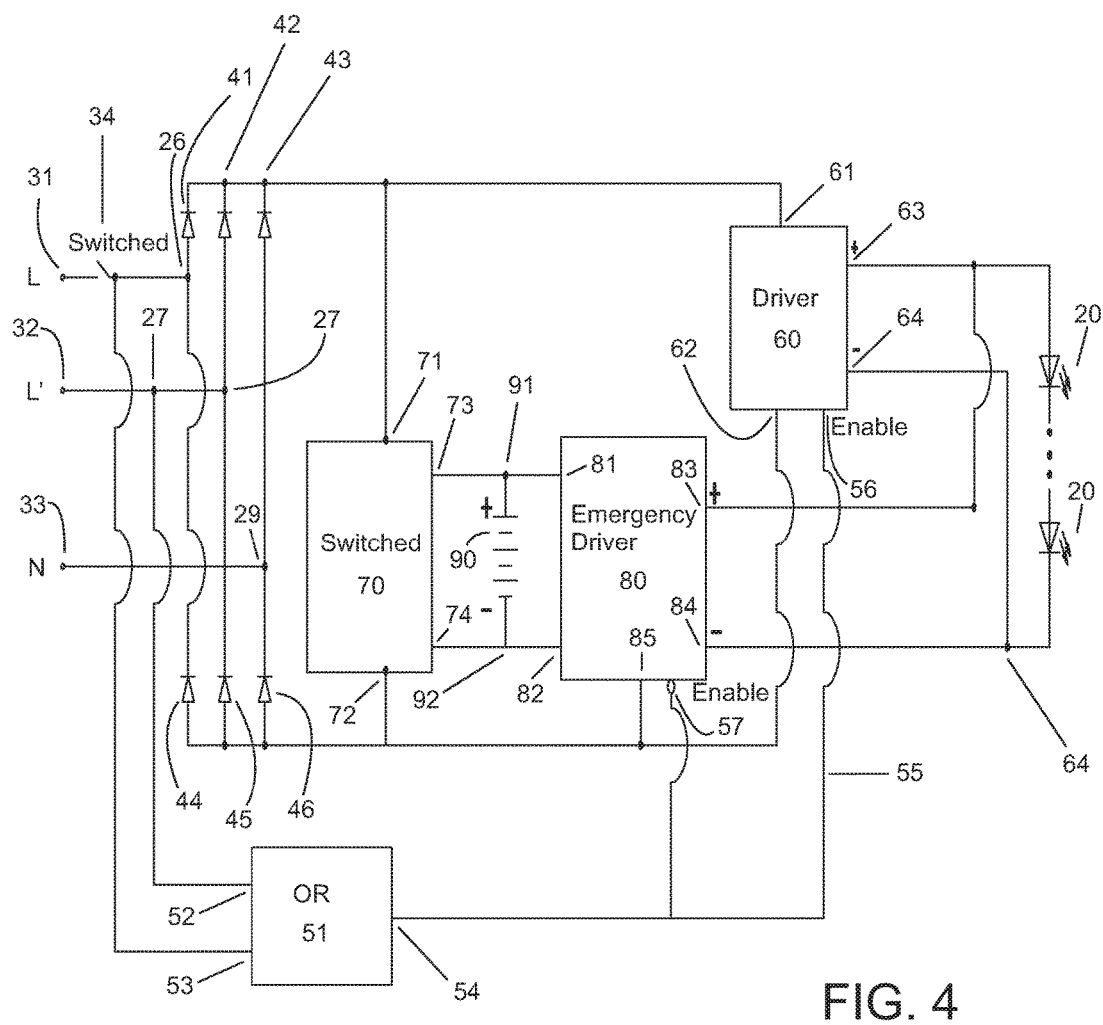
FIG. 4 is a circuit diagram of the present invention in an alternate embodiment.

As seen in FIG. 4, the emergency driver can also have an emergency driver neutral input 85. The circuit diagram here is similar to the previous diagram except that the installation cannot distinguish between or does not need to distinguish between L and L'. Using an OR circuit 51, the system senses for complete loss of line voltage on the or circuit second line input 52 and the or circuit first line input 53. The or circuit 51 has an OR circuit output 54. A situation where the different lines do not need to be distinguished is a situation such as the first figure where the terminals can be rotated 180 degrees, or the lamp as shown in the second figure where the orientation is reversed, also in the bulb example of the fifth figure a wiring configuration might have all black wires for attaching to the tip and ring.

The first line in 31 connects to the first line terminal 26, which is located between and electrically connected to the first line primary diode 41 and the first line secondary diode 44. The second line in 32 is connected to the second line terminal 27, which is located between and electrically connected to the second line primary diode 42 and the second line secondary diode 45. The neutral line in 33 is electrically connected to the first neutral terminal 29 which is located between and electrically connected to a neutral line primary diode 43 and a neutral line secondary diode 46.

L, L' and N pass through their respective rectifiers. A first route will go to the main driver for normal operation and a second route will go to the battery charge controller also called the battery charger to charge the battery, then to the emergency driver for emergency operation. Since the L and L' could not be distinguished, both will connect to an OR circuitry. When either line input shows voltage, the output of the OR circuitry will indicate that the power is normal. The OR circuit output signal 54 will enable the main driver 60 for normal operation and disable the emergency driver 80. When both L and L' have no voltage, the OR circuit output signal 54 will indicate there is no power (emergency mode), the signal will disable driver for normal operation and enable emergency driver for emergency operation. The OR circuit is a voltage checker also because it checks for voltage on two lines.

Figure 5:
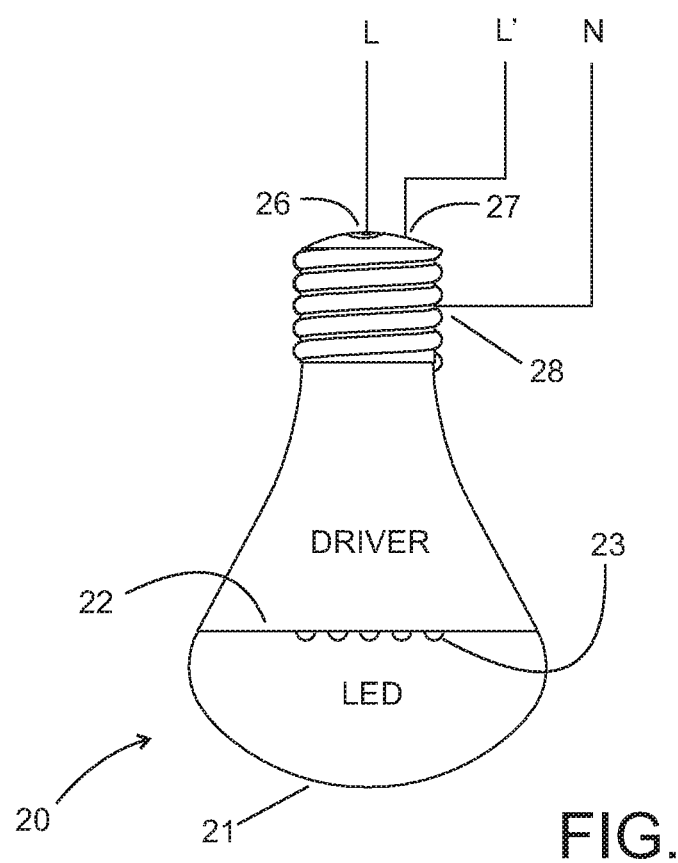
FIG. 5 is a diagram of an LED bulb with three terminals in a screw base.

As seen in FIG. 5, the LED bulb may have a tip contact with L and a ring contact to L' and have a neutral contact as well.

The invention claimed is:

1. An emergency lamp comprising:
   a. a first line contact configured for connection to a first line;
   b. a second line contact configured for connection to a second line, wherein the second line is not switched;
   c. a neutral line contact configured for connection to a neutral line;
   d. a voltage checker, wherein the voltage checker changes a mode of a main driver enablement signal and an emergency driver enablement signal when the voltage checker does not sense voltage, wherein the voltage checker is electrically connected to the second line;
   e. a main driver powered by the first line and the neutral line, wherein the main driver is controlled by the main driver enablement signal;
   f. an emergency driver powered by a battery, wherein the battery is maintained by a charge controller, wherein the charge controller is powered by the second line and the neutral line, wherein the emergency driver is controlled by an emergency driver enablement signal; and
   g. a lamp, wherein the lamp is powered by the main driver during a state of normal operation, and wherein the lamp is powered by the emergency driver during a state of emergency operation, wherein the lamp further includes a lamp housing retaining a circuit board, wherein the circuit board retains LED chips mounted to the circuit board, wherein the lamp housing is tubular, wherein a change of state of the main driver enablement signal and the emergency driver enablement signal activates the emergency driver.

2. The emergency lamp of claim 1, further including a primary driver rectifier powering the main driver, and further including a secondary driver rectifier powering the charge controller, wherein the driver produces a driver line out and a driver neutral out to power the lamps.

3. The emergency lamp of claim 1, wherein e voltage checker is an OR circuit.

4. The emergency lamp of claim 1, wherein the lamp housing is bulb shaped.

5. The emergency lamp of claim 1, wherein the lamp housing is tubular and has a first housing connector and a second housing connector, wherein the first housing connector is connected to the first line and the second line, and wherein the second housing connector is connected to the neutral line.

6. The emergency lamp of claim 1, wherein the lamp housing is tubular and has a first housing connector and a second housing connector, wherein the first housing connector is connected to the first line and the neutral line, and wherein the second housing connector is connected to the second line.

* * * * *